US012568389B2

(12) United States Patent
Niu et al.

(10) Patent No.:  US 12,568,389 B2
(45) Date of Patent:       Mar. 3, 2026

(54) MEASUREMENT METHOD AND APPARATUS, NODE, AND STORAGE MEDIUM

(71) Applicant: ZTE CORPORATION, Shenzhen (CN)

(72) Inventors: Li Niu, Shenzhen (CN); Bo Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 631 days.

(21) Appl. No.: 17/759,107

(22) PCT Filed: Apr. 6, 2021

(86) PCT No.: PCT/CN2021/085701
§ 371 (c)(1),
(2) Date: Jul. 20, 2022

(87) PCT Pub. No.: WO2021/204121
PCT Pub. Date: Oct. 14, 2021

(65) Prior Publication Data
US 2023/0052779 A1      Feb. 16, 2023

(30) Foreign Application Priority Data

Apr. 10, 2020    (CN) .......................... 202010280192.1

(51) Int. Cl.
*H04W 24/10*          (2009.01)
*H04B 17/309*         (2015.01)
(Continued)

(52) U.S. Cl.
CPC .......... *H04W 24/10* (2013.01); *H04B 17/309* (2015.01); *H04W 74/0808* (2013.01)

(58) Field of Classification Search
CPC . H04W 24/10; H04W 24/08; H04W 74/0808; H04W 74/0833; H04W 72/0453;
(Continued)

(56) References Cited

U.S. PATENT DOCUMENTS

2014/0105013 A1      4/2014  Sawai et al.
2017/0294977 A1     10/2017  Uchino et al.
(Continued)

FOREIGN PATENT DOCUMENTS

CN          102480756 A       5/2012
CN          102685795 A       9/2012
(Continued)

OTHER PUBLICATIONS

Industrial Property Cooperation Center (IPCC). Search Report for JP Application No. 2022-550224 and English translation, mailed Jul. 21, 2023, pp. 1-76.
(Continued)

*Primary Examiner* — Candal Elpenord
(74) *Attorney, Agent, or Firm* — Vivacqua Crane, PLLC

(57) ABSTRACT

Disclosed herein are a measurement method and apparatus, a node, and a non-transitory computer-readable storage medium. The measurement method may include: acquiring, by a first communication node, measurement information configured by a second communication node; performing, by the first communication node, measurement according to the measurement information to obtain a measurement result; and reporting, by the first communication node, a channel state indication which carries the measurement result in response to the measurement result meeting a reporting condition.

7 Claims, 5 Drawing Sheets

A first communication node acquires measurement information configured by a second communication node ⟶ S301

The first communication node performs measurement according to the measurement information, and acquires a measurement result ⟶ S302

The first communication node reports a channel state indication that carries the measurement result in response to the measurement result meeting a report condition ⟶ S303

(51) Int. Cl.

| | |
|---|---|
| *H04B 17/318* | (2015.01) |
| *H04W 74/08* | (2024.01) |
| *H04W 74/0808* | (2024.01) |

(58) Field of Classification Search
CPC .... H04B 17/318; H04B 17/309; H04B 17/24;
H04B 17/345; H04B 17/382; H04L
5/0057; H04L 5/0094
USPC .......................................... 370/252, 329–330
See application file for complete search history.

(56) References Cited

U.S. PATENT DOCUMENTS

| | | | |
|---|---|---|---|
| 2018/0205439 A1 | 7/2018 | Chen et al. | |
| 2019/0149290 A1* | 5/2019 | Liu | H04L 5/0023 |
| | | | 370/329 |
| 2019/0166625 A1* | 5/2019 | Nam | H04W 74/0816 |
| 2019/0364599 A1* | 11/2019 | Islam | H04L 5/0048 |
| 2020/0092913 A1* | 3/2020 | Xu | H04W 72/0446 |
| 2020/0100267 A1 | 3/2020 | Kim et al. | |
| 2020/0275295 A1 | 8/2020 | Liu | |
| 2020/0288340 A1* | 9/2020 | Sadeghi | H04W 72/0446 |
| 2020/0367083 A1* | 11/2020 | Hao | H04B 7/0695 |
| 2021/0345424 A1* | 11/2021 | Cirik | H04W 74/0816 |

| | | | |
|---|---|---|---|
| 2022/0132527 A1* | 4/2022 | Cui | H04W 56/001 |
| 2022/0225412 A1* | 7/2022 | Tooher | H04W 72/0453 |
| 2022/0386357 A1* | 12/2022 | Li | H04W 72/23 |

FOREIGN PATENT DOCUMENTS

| | | |
|---|---|---|
| CN | 103391575 A | 11/2013 |
| CN | 110113818 A | 8/2019 |
| CN | 111901822 A | 11/2020 |
| JP | 2018522488 A | 8/2018 |
| WO | 2016121877 A1 | 8/2016 |
| WO | 2019151819 A1 | 8/2019 |

OTHER PUBLICATIONS

Japan Patent Office. Notice of Reasons for Refusal for JP Application No. 2022-550224 and English translation, mailed Aug. 29, 2023, pp. 1-8.
International Searching Authority. International Search Report and Written Opinion for PCT Application No. PCT/CN2021/085701 and English translation, mailed Jul. 5, 2021, pp. 1-13.
European Patent Office. Partial Supplementary European Search Report for EP Application No. 21785141.9, mailed Apr. 9, 2024, pp. 1-14.

* cited by examiner

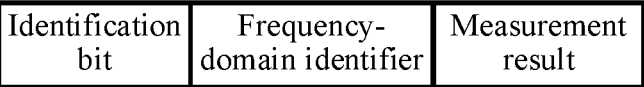

| Identification bit | Frequency-domain identifier | Measurement result |
|---|---|---|

Fig. 4

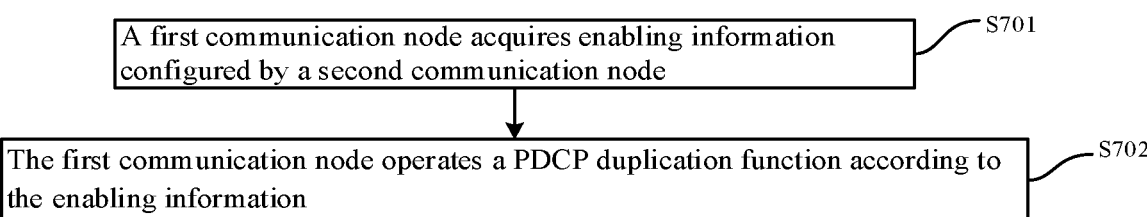

| Identification bit | Frequency-domain identifier | Measurement result 1 | Measurement result 2 | Measurement result 3 | ...... |
|---|---|---|---|---|---|

Fig. 5

| Identification bit | Frequency-domain identifier 1 | Frequency-domain identifier 2 | Frequency-domain identifier 3 | Frequency-domain identifier 4 | ...... |
|---|---|---|---|---|---|

Fig. 6

A first communication node acquires enabling information configured by a second communication node ⟋ S701

↓

The first communication node operates a PDCP duplication function according to the enabling information ⟋ S702

Fig. 7

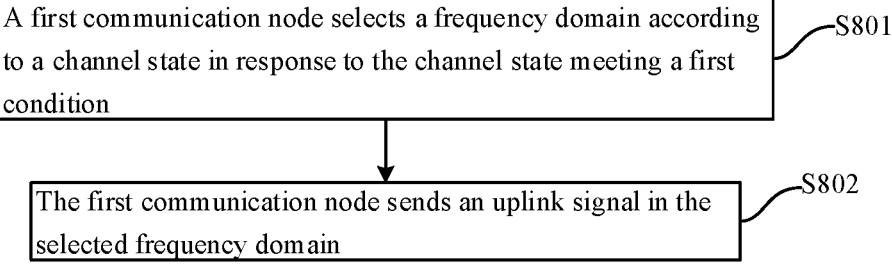

A first communication node selects a frequency domain according to a channel state in response to the channel state meeting a first condition ⟋ S801

↓

The first communication node sends an uplink signal in the selected frequency domain ⟋ S802

Fig. 8

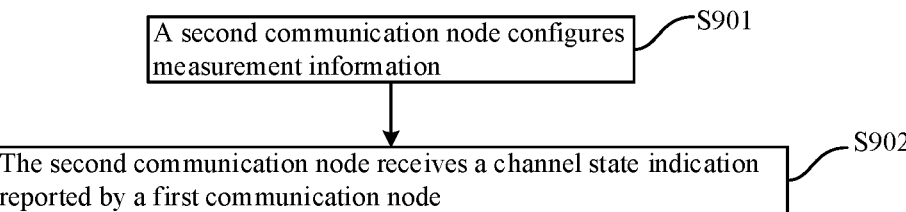

A second communication node configures measurement information ⟋ S901

↓

The second communication node receives a channel state indication reported by a first communication node ⟋ S902

Fig. 9

MEASUREMENT METHOD AND APPARATUS, NODE, AND STORAGE MEDIUM

CROSS-REFERENCE TO RELATED APPLICATION

This application is a national stage filing under 35 U.S.C. § 371 of international application number PCT/CN2021/085701, filed Apr. 6, 2021, which claims priority to Chinese patent application No. 202010280192.1, filed on Apr. 10, 2020. The contents of the international application are incorporated herein by reference in their entirety.

TECHNICAL FIELD

The present disclosure relates to the field of communication technologies, in particular, to a measurement method and apparatus, a node, and a non-transitory computer-readable storage medium.

BACKGROUND

An unlicensed spectrum belongs to a shared spectrum, and a node needs to obtain a channel access right by competition so as to use the spectrum. When there are many nodes, the nodes may fail to preempt a channel, causing uncertainty in data transmission on the unlicensed spectrum, or the preemption of a channel may be delayed, resulting in delay in data transmission. Moreover, hidden nodes may exist in the unlicensed spectrum. As shown in FIG. 1, Node 1 and Node 2 may be interfered by Node 4, but the distant Node 3 will not be interfered by Node 4, and Node 3 cannot perceive the existence of Node 4. Therefore, Node 4 is a hidden node of Node 1 and Node 2.

In order to guarantee requirements of some services for latency, interference needs to be detected timely. The following two methods are generally adopted to measure channel interference. One method is to measure the intensity of interference. A signal is measured at each measurement moment to obtain a received signal strength, then the received signal strengths at all measurement moments within a certain time (determined by a report cycle) are averaged to obtain an average received channel strength (e.g., a Received Signal Strength Indication (RSSI)). The other method is to measure a frequency of interference and intensity of interference. A signal is measured at each measurement moment to obtain a received signal strength. When the received signal strength at some measurement moments within a period of time is higher than a certain threshold, a percentage (e.g., Channel Occupancy (CO)) of such measurement moments to all measurement moments is calculated. The measurement moments may be configured as periodic moments (e.g., Orthogonal Frequency Division A plurality ofxing (OFDM) symbols, subframes).

However, both methods measure a magnitude and a frequency of interference in terms of probability. If a long report cycle is configured, when there are some moments with strong interference within the measurement time, a signal with strong interference may be averaged because many measurement moments are counted. As a result, the interference cannot be seen from the measurement results. If a short report cycle is configured, a measurement report is frequently reported. In addition, the two measurement results are sent to a node through a Radio Resource Control (RRC) message of the measurement report, so the node cannot detect the interference in time.

SUMMARY

According to some embodiments of the present disclosure, a measurement method is provided, which may include: acquiring, by a first communication node, measurement information configured by a second communication node; performing, by the first communication node, measurement according to the measurement information to obtain a measurement result; and reporting, by the first communication node, a channel state indication that carries the measurement result in response to the measurement result meeting a report condition.

According to some embodiments of the present disclosure, a measurement method is further provided, which may include: acquiring, by a first communication node, enabling information configured by a second communication node, the enabling information being used for indicating whether to enable the first communication node to activate a packet data convergence protocol (PDCP) duplication function, and/or whether to enable the first communication node to deactivate the PDCP duplication function; and operating, by the first communication node, the PDCP duplication function according to the enabling information.

According to some embodiments of the present disclosure, a measurement method is further provided, which may include: selecting, by a first communication node, a frequency domain according to a channel state in response to the channel state meeting a first condition; and sending, by the first communication node, an uplink signal in the selected frequency domain.

According to some embodiments of the present disclosure, a measurement method is further provided, which may include: configuring, by a second communication node, measurement information; and receiving, by the second communication node, a channel state indication reported by a first communication node, the channel state indication carrying a measurement result measured by the first communication node according to the measurement information.

According to some embodiments of the present disclosure, a measurement method is further provided, which may include: broadcasting, by a second communication node, a system information block (SIB); and sending, by the second communication node, dedicated signaling to a first communication node.

According to some embodiments of the present disclosure, a measurement apparatus is further provided, which may include: an acquisition module configured to acquire measurement information configured by a second communication node; a measurement module configured to perform measurement according to the measurement information to obtain a measurement result; and a communication module configured to report a channel state indication that carries the measurement result in response to the measurement result meeting a report condition.

According to some embodiments of the present disclosure, a measurement apparatus is further provided, which may include: an acquisition module configured to acquire enabling information configured by a second communication node, the enabling information being used for indicating whether to enable the measurement apparatus to activate a packet data convergence protocol (PDCP) duplication function, and/or whether to enable the measurement apparatus to deactivate the PDCP duplication function; and a processing module configured to operate the PDCP duplication function according to the enabling information.

According to some embodiments of the present disclosure, a measurement apparatus is further provided, which may include: a selection module configured to select a frequency domain according to a channel state in response to the channel state meeting a first condition; and a communication module configured to send an uplink signal in the selected frequency domain.

According to some embodiments of the present disclosure, a measurement apparatus is further provided, which may include: a configuration module configured to configure measurement information; and a communication module configured to receive a channel state indication reported by a first communication node, the channel state indication carrying a measurement result measured by the first communication node according to the measurement information.

According to some embodiments of the present disclosure, a measurement apparatus is further provided, which may include: a communication module configured to broadcast an SIB; and send dedicated signaling to a first communication node.

According to some embodiments of the present disclosure, a node is further provided, which may include: a memory, a processor, and a computer program stored in the memory and executable by the processor, where the computer program, when executed by the processor, causes the processor to perform the measurement method according to any one of the embodiments of the present disclosure.

According to some embodiments of the present disclosure, further provided is a non-transitory computer-readable storage medium storing a computer program which, when executed by a processor, causes the processor to perform the measurement method according to any one of the embodiments of the present disclosure.

BRIEF DESCRIPTION OF DRAWINGS

FIG. 4 is a schematic diagram of a media access control-control element (MAC CE) according to an embodiment;

FIG. 5 is a schematic diagram of an MAC CE according to an embodiment;

FIG. 6 is a schematic diagram of an MAC CE according to an embodiment;

FIG. 7 is a flowchart of a measurement method according to an embodiment;

FIG. 8 is a flowchart of a measurement method according to an embodiment;

FIG. 9 is a flowchart of a measurement method according to an embodiment;

DETAILED DESCRIPTION

Embodiments of the present disclosure are described hereinafter with reference to the accompanying drawings.

In the embodiments of the present disclosure, terms such as "optionally" or "for example" is used to denote an example, an illustration, or a description. Any embodiment or design scheme described as "optionally" or "for example" in the embodiments of the present disclosure should not be explained as being more preferred or having more advantages than another embodiment or design scheme. Rather, the use of the terms such as "optionally" or "for example" is intended to present a related concept in a specific manner.

In order to facilitate the understanding of the schemes of the embodiments of the present disclosure, illustrative descriptions of some concepts related to the present disclosure are given for reference as follows.

Figure 1:
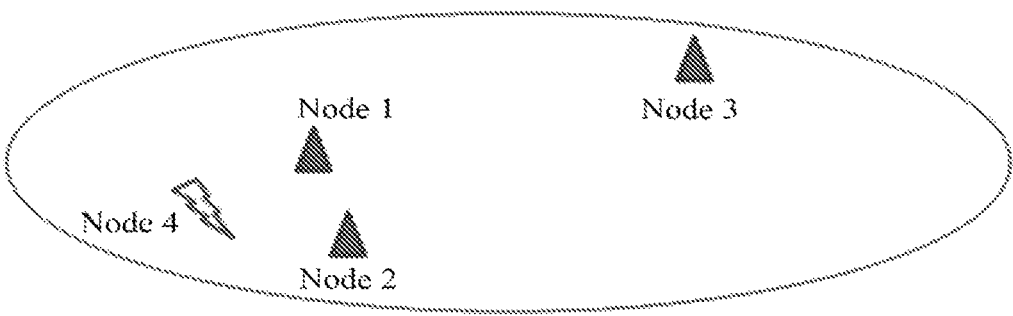
FIG. 1 is a schematic diagram showing presence of hidden nodes in an unlicensed spectrum.
Figure 2:
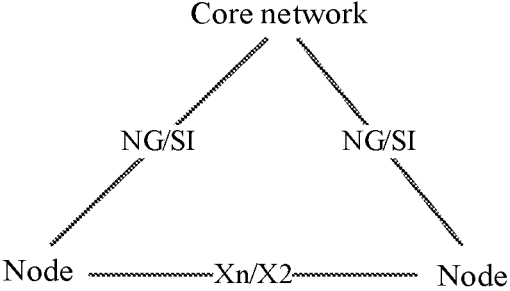
FIG. 2 is a schematic architectural diagram of a network node.

Unlicensed Spectrum: used for networking in a cellular network, which may serve as a secondary spectrum of a licensed spectrum for use as a spectrum resource of a dual-linked secondary node (SN) or a spectrum resource of an assisted cell of carrier aggregation, or may be separately networked for use as a spectrum resource of a standalone cell. FIG. 2 shows a network-side architecture when an unlicensed spectrum is used for the 4th Generation mobile communication system (4G)/5G networking. Nodes (e.g., base stations) use the unlicensed spectrum to provide wireless services, and are connected to a core network device through an NG/SI interface. The nodes are connected through an Xn/X2 interface.

Listen Before Talk (LBT) Mechanism: developed by the 3rd generation partnership project (3GPP) and the European telecommunications standards institute (ETSI). Before sending data, a sender needs to monitor whether a channel is at an idle state. If yes, the sender uses the channel to send data. Otherwise, the sender needs to continue monitoring until the channel is at an idle state. For example, two nodes share a bandwidth of 100 MHz. If the nodes need to send data, they need to contend for a bandwidth to be occupied. If two nodes prepare to send data in the same bandwidth at the same time, the two nodes need to contend and the node succeeding in the contention can send the data.

Figure 3:
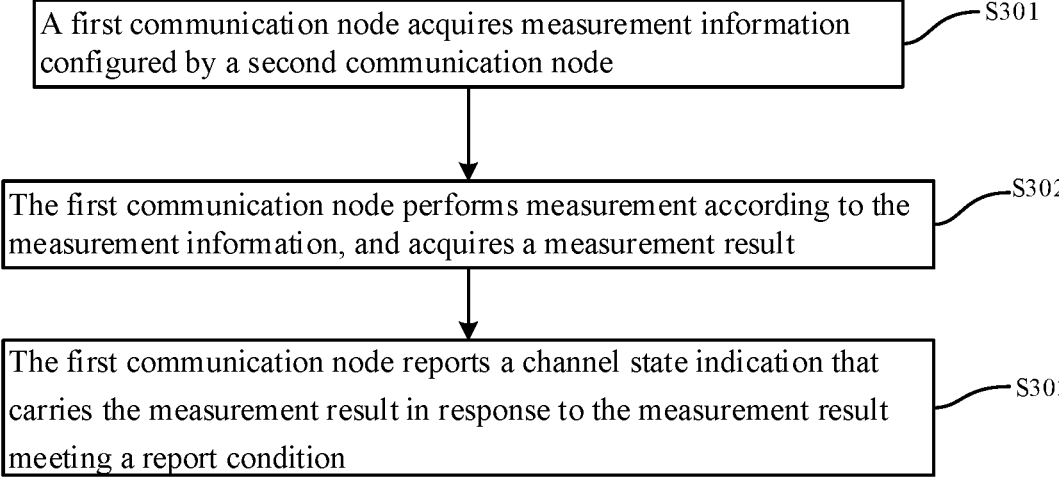
FIG. 3 is a flowchart of a measurement method according to an embodiment.

Based on the explanations of the above concepts, FIG. 3 is a flowchart of a measurement method according to an embodiment of the present disclosure. As shown in FIG. 3, the method may include steps S301 to S303.

At S301, a first communication node acquires measurement information configured by a second communication node.

In the embodiment, the first communication node and the second communication node may be two different types of communication nodes. For example, the first communication node may be understood as a terminal, and the second communication node may be understood as a base station. Then, this step may be understood as acquiring, by a terminal, measurement information configured by a base station.

At S302, the first communication node performs measurement according to the measurement information to obtain a measurement result.

The second communication node may configure measurement for the first communication node through an RRC message (e.g., an RRC reconfiguration message). For example, the second communication node may configure measurement information and a measurement trigger condition. After receiving the message, the first communication node determines that the second communication node has configured the measurement trigger condition, and may make judgment of conditional measurement. If the second communication node does not configure the measurement trigger condition, measurement may be performed according to the measurement information.

At S303, the first communication node reports a channel state indication that carries the measurement result in the case of the measurement result meeting a report condition.

After performing measurement according to the measurement information, the first communication node may acquire a measurement result. When acknowledging that the measurement result meets a report condition, the first communication node reports a channel state indication to the second communication node. The channel state indication carries the measurement result.

In this way, the second communication node may acknowledge an actual state of a current channel according to the measurement result reported by the first communication node. If the second communication node determines that the first communication node is interfered, the first communication node may be scheduled to another frequency domain, so as to ensure normal transmission of services having higher requirements for latency (e.g., ultra reliable low latency communications (URLLC)) on the first communication node.

In embodiments of the present disclosure, the measurement information configured by the second communication node may include an indication indicating whether to enable the first communication node to perform measurement, or a measurement trigger condition configured in the case of enabling the first communication node to perform measurement, or a duration of a measurement window and an interval granularity of the measurement window, or a pre-configured resource, or, the second communication node may configure indication information to clearly indicate whether the first communication node needs to perform measurement.

For example, the second communication node may carry an information element (IE) in the RRC message. The IE indicates whether to enable the first communication node to perform measurement. The IE may be 1 bit (for example, 1 indicates Enable measurement) or an enumeration value (for example, an option of the enumeration value indicates Enable measurement).

The measurement window may include a preset duration or a plurality of measurement moments. The pre-configured resource may be a time-frequency resource configured by the second communication node.

For example, the second configuration node may configure whether some measurement configurations (e.g., one or more measurement configurations) exist to indicate whether to enable the first communication node to perform measurement. For example, it is indicated, through a quality of service parameter of a bearer service, whether to enable the first communication node to perform measurement. For example, if a latency of a service mapped by a data resource bearer (DRB) is required to be less than a threshold, the first communication node may make judgment of conditional measurement. The second communication node configures a DRB through the RRC message, and a URLLC service is mapped by the DRB. The first communication node receives the message, and if judging that a latency of a service mapped by the DRB is required to be less than a threshold, makes judgment of conditional measurement.

It is indicated, through a transmission latency of the bearer service, whether to enable the first communication node to perform measurement. For example, if a latency of a service mapped by a DRB is required to be less than a threshold, the first communication node makes judgment of conditional measurement. The second communication node configures a DRB through the RRC message, and a URLLC service is mapped by the DRB. The first communication node receives the message, and if judging that an air interface transmission latency of URLLC service mapped by DRB is less than a threshold, makes judgment of conditional measurement.

It is indicated, through whether to-be-transmitted data exists on a logical channel or whether a scheduling request (SR) corresponding to the logical channel is triggered, whether to enable the first communication node to perform measurement. For example, the second communication node maps a URLLC service to a logical channel, and configures an SR resource for the logical channel. When the first communication node judges that there is to-be-transmitted data on the logical channel and the corresponding SR is triggered, the first communication node makes judgment of conditional measurement.

It is indicated, through whether a type1 configured grant is configured, or whether a type2 configured grant or semi-persistent scheduling (SPS) is activated, whether to enable the first communication node to perform measurement. If the second communication node configures the type1 configured grant or activates the type2 configured grant or SRS for the first communication node, the first communication node makes judgment of conditional measurement.

Alternatively, the second communication node may also configure a measurement trigger condition. When the first communication node is enabled to perform measurement, the first communication node may perform measurement according to the configuration if judging that the measurement trigger condition is met, otherwise, the first communication node does not perform measurement.

For example, the measurement trigger condition configured by the second communication node may include a measured received signal strength being greater than a signal strength threshold, or a received signal strength at several consecutive measurement moments being greater than the signal strength threshold, or an LBT failure rate being greater than a first threshold within a preset time, or a measured Channel Occupancy (CO) being greater than a second threshold within a preset time, or a retransmission probability of a data packet being greater than a third threshold.

When the first communication node acknowledges that the measurement trigger condition is met, the first communication node may perform measurement in a following period of time, and calculate a channel state indication or measurement result according to a measurement value in this period of time.

For example, the second communication node configures a measurement configuration of the first communication node through the RRC message, which may include at least one of a measurement object, a measurement bandwidth, a measurement trigger condition, a measurement time/window and a measurement quantity.

The measurement object is, for example, a frequency channel number or a Bandwidth Part (BWP).

The measurement bandwidth is, for example, an LBT bandwidth or a plurality of LBT bandwidths. The plurality of LBT bandwidths may be continuous or discontinuous. For example, if a plurality of LBT bandwidths are configured, a start frequency-domain position and a frequency-domain length may be configured, or a list may be configured. Each item in the list includes a start frequency-domain position and a frequency-domain length.

The measurement trigger condition is, for example, a measured received signal strength being greater than a signal strength threshold, or a received signal strength at several consecutive measurement moments being greater than the signal strength threshold, or an LBT failure rate being greater than a first threshold within a preset time, or a measured CO exceeding a second threshold within a preset time, or a Hybrid Auto Repeat Request (HARD) retransmission probability of a data packet reaching a third threshold. The thresholds may be configured by the second communication node.

The measurement time/window may for example be determined by a cycle and a duration of each cycle, or the measurement time may be a continuous period of time.

The measurement quantity includes, for example, a measured interference intensity, a measured interference frequency, or the like.

During the measurement, if the first communication node judges that the configured measurement trigger condition is met at certain a moment, the first communication node measures a configured measurement object (one or more frequency domains) according to the configured measurement time, and calculates a channel state indication or measurement result of the measurement quantity (one or more frequency domains) according to a measurement value in the measurement time.

The above process is described below with specific examples. For example, the second communication node configures the measurement configuration through the RRC reconfiguration message, including: a frequency channel number to be measured, a measurement bandwidth of 20 MHz, a signal strength threshold of a received signal strength, measurement moments that are several consecutive slots, and a measurement quantity including a Received Signal Strength Indication (RSSI) and a CO. If the first communication node determines that the received signal strength at a moment is higher than the signal strength threshold of the received signal strength when performing RSSI measurement, the first communication node performs measurement according to a configured measurement moment, and obtains an RSSI and a CO according to RSSI measurement values at all measurement moments within the measurement time.

Alternatively, the second communication node configures the measurement configuration through the RRC reconfiguration message, including: a frequency channel number to be measured, a measurement bandwidth of 20 MHz, a transmission latency threshold of a DRB, measurement moments determined by a cycle and a duration, and a measurement quantity including an RSSI and a CO. If the first communication node determines that a transmission latency of a DRB is higher than a threshold of the transmission latency of the DRB when performing RSSI measurement, the first communication node performs measurement according to a configured measurement duration, and obtains an RSSI and a CO according to RSSI measurement values at all measurement moments in the measurement duration.

Alternatively, the second communication node configures the measurement configuration through the RRC reconfiguration message, including: a frequency channel number to be measured, a measurement bandwidth of continuous 100 MHz, a signal strength threshold of a received signal strength, a measurement moment that is a continuous duration, and a measurement quantity including an RSSI and a CO. If the first communication node determines that a received signal strength of 20 MHz at a moment is higher than the signal strength threshold of the received signal strength when performing RSSI measurement, the first communication node measures 100 MHz according to a configured measurement duration. For example, for each 20 MHz, five 20-MHz RSSIs and a CO are obtained according to RSSI measurement values at all measurement moments in the measurement duration.

In the above example, the first communication node may measure one or more frequency domains according to the measurement information at the measurement moment.

In the case that the measurement information is a measurement window, the first communication node may perform measurement at all measurement moments in the measurement window to obtain measurement values of all the measurement moments, and calculates the measurement values of all the measurement moments to obtain a measurement result. Then, the measurement window may slide to a following period of time. The time may be determined according to an interval granularity of the measurement window. The interval granularity of the measurement window may be a duration or a plurality of measurement moments. In this case, the measurement window still has a fixed duration. The first communication node repeats the above processes in the same manner to obtain measurement values of all the measurement moments in the measurement window and calculate a measurement result.

Alternatively, the first communication node performs measurement at a measurement moment, and from this moment, takes a measurement window as a measurement length to obtain measurement values of all measurement moments within the measurement window and calculate a measurement result. There is an interval between the measurement result generated at this measurement moment and a measurement result generated at a previous measurement moment. The interval is determined by the interval granularity of the measurement window.

Alternatively, the first communication node obtains measurement values of all the measurement moments in the measurement window, calculates a temporary result, and weights the temporary result with the measurement result obtained in the previous measurement window to obtain a measurement result. That is, the first communication node weights this measurement result with the previous measurement result to obtain a measurement result. For example, the first communication node obtains Result 1 in Measurement Window 1 and Temporary Result 2 in Measurement Window 2, and obtains a measurement result according to a weighting manner of a*Result 1+b*Result 2, where a and b are weights.

Similarly, the above process is described with specific examples. For example, the second communication node configures a cycle of the measurement moment as 10 ms, a start moment as slot0, the measurement duration as 11 symbols, the measurement window as 50 ms, and the interval granularity as 10 ms. After acquiring the measurement configuration, the first communication node obtains measurement moments as slot0 symbol 0 to symbol 10, slot10 symbol 0 to symbol 10, slot20 symbol 0 to symbol 10, slot30 symbol 0 to symbol 10, slot40 symbol 0 to symbol 10, slot50 symbol 0 to symbol 10, . . . . The first communication node obtains measurement values (e.g., slot0 symbol 0 to slot40 symbol 10) of all measurement moments, for example, a received signal strength of each measurement moment, and average such values to obtain an average received signal strength. Alternatively, when the received signal strength at certain measurement moments is higher than a signal strength threshold, a CO is obtained according to a percentage of such measurement moments to all the measurement moments. The following measurement moments are slot10 symbol 0 to symbol 10, slot20 symbol 0 to symbol 10, slot30 symbol 0 to symbol 10, slot40 symbol 0 to symbol 10, slot50 symbol 0 to symbol 10, . . . . The first communication node obtains measurement values (e.g., slot10 symbol 0 to slot50 symbol 10) of all measurement moments, and then obtains a received signal strength or a CO, and so on.

In the case that the measurement information is a pre-configured resource, the first communication node measures one or more frequency domains at a transmission moment of the pre-configured resource. That is, the measurement moment is the transmission moment of the pre-configured resource.

For example, the second communication node configures a pre-configured resource (configured grant or SPS). The pre-configured resource includes a transmission moment (determined by a cycle, a start moment, etc.), a frequency-domain position, and so on. The second communication node configures, through an RRC message, an MAC CE or Downlink Control Information (DCI), the first communication node to measure the pre-configured resource. The measurement object is a frequency-domain position (e.g., a start position or central position) of the pre-configured resource or an index of the pre-configured resource. The measurement bandwidth is a bandwidth occupied by the pre-configured resource. The measurement moment is a transmission moment of the pre-configured resource. The measurement quantity is received signal strength, a CO, an LBT failure probability, and the like. The RRC message, MAC CE or DCI may carry the index of the pre-configured resource. After acquiring the configuration information, the first communication node takes a frequency domain where the pre-configured resource is located as a measurement object and an occupied bandwidth as a measurement bandwidth to perform measurement at the transmission moment of the pre-configured resource, to obtain a measurement result.

The above process is described below with specific examples. It is assumed that the second communication node configures a cycle of the pre-configured resource as 10 ms, the start moment as slot0, the symbol as 0, the duration as 5 symbols, the frequency-domain position as a start position M of a Physical Resource Block (PRB) index and the number N of occupied PRBs, and the index as X. The second communication node configures the measurement object as a pre-configured resource with an index of X, and the measurement quantity as an LBT failure probability. After acquiring the configured measurement information, the first communication node determines that the measurement object is a frequency channel number corresponding to (M+N)/2, the measurement bandwidth is a bandwidth corresponding to N, and the measurement moments are slot0 symbol 0 to symbol 4, slot10 symbol 0 to symbol 4, slot20 symbol 0 to symbol 4, . . . . The first communication node counts a LBT failure probability at these measurement moments.

Since a quality of communication of a channel may be reflected by a measurement result, the measurement result may be reported to the second communication node timely when the first communication node determines, according to the measurement result, that the channel has poor quality or is subjected to strong interference.

In embodiments of the present disclosure, the second communication node may configure, through the RRC message, a condition under which the first communication node reports a channel state indication that carries the measurement result. For example, the condition may include at least one of a trigger time and a report manner.

The trigger time is, for example, a time required to meet a report trigger condition. The report trigger condition is, for example, a measurement result being higher than a threshold, and the like.

The report manner is, for example, a Physical Uplink Control Channel (PUCCH), an MAC CE, an RRC message, a Physical Random Access Channel (PRACH), or a Sounding Reference Signal (SRS).

If the first communication node determines that a measurement result (one or more LBT bandwidths) meets the report trigger condition all the time within the trigger time when performing measurement, the first communication node triggers report of a channel state indication according to the report manner. The channel state indication may carry a measurement result meeting a report condition (or a plurality of measurement results corresponding to a plurality of LBT bandwidths), and may additionally or alternatively include a measurement object corresponding to the measurement result.

For example, the second communication node configures the measurement configuration through an RRC reconfiguration message, including a frequency channel number to be measured, a measurement bandwidth of 20 MHz, a measurement time cycle and a duration of each cycle, a signal strength threshold of an RSSI, a measurement quantity that is the RSSI, a duration of a trigger time, a report trigger condition of RSSIs at all measurement moments within the trigger time being greater than the signal strength threshold, and a report manner of PUCCH, and configures a corresponding PUCCH resource. If the first communication node determines that the received signal strength at a moment is greater than the signal strength threshold when performing measurement, the first communication node measures an RSSI according to the configured measurement time. If the RSSIs at all measurement moments within the trigger time are greater than the signal strength threshold, the first communication node sends a signal on the configured PUCCH resource.

The second communication node configures the measurement configuration through an RRC reconfiguration message, including a frequency channel number to be measured, a measurement bandwidth of 100 MHz, a measurement time cycle and a duration of each cycle, a signal strength threshold of an RSSI, a measurement quantity that is the RSSI, a duration of a trigger time, a report trigger condition of RSSIs at all measurement moments at a measurement bandwidth of 20 MHz within the trigger time being greater than the signal strength threshold, and a report manner of PUCCH, and configures a corresponding PUCCH resource. If the first communication node determines that the received signal strength at a moment at a measurement bandwidth of 20 MHz is greater than the signal strength threshold when performing measurement, the first communication node may measure an RS SI according to the configured measurement time. If the RSSIs at all measurement moments at a measurement bandwidth of 20 MHz within the trigger time are greater than the signal strength threshold, the first communication node sends an interference indication of 100 MHz to the second communication node on the configured PUCCH resource.

In an example, the first communication node may report the channel state indication of the measurement result through a first transmission resource. The first transmission resource includes any one of the following transmission resources: an MAC CE, a PUCCH, an SRS, a PRACH, and Uplink Control Information (UCI). The reported channel state indication may also be judged through a measurement quantity such as Reference Signal Receiving Power (RSRP), Reference Signal Received Quality (RSRQ), an RSSI, or a CO.

For example, the first communication node may use the MAC CE to report channel information and channel quality or report only the channel information. The channel quality may be, for example, received signal quality, interference intensity, or an interference value. The channel information may be, for example, a frequency channel number, or a frequency channel number index.

For example, the channel quality may be expressed by a measurement result such as a measured interference intensity or a measured interference frequency, and is reported to the second communication node through an MAC CE. If the measurement result has a large value range, the measurement result may be quantified. In this way, when the measurement result is within a value range, the reported measurement result is a quantified value. For example, when the CO is greater than 80 and less than 100, the quantified CO is high, which may be expressed as 11.

The channel information may be, for example, an identifier of a measurement object or a frequency-domain index. For example, in the case of a frequency-domain identifier, if the channel information and the channel quality are reported, a corresponding relationship between the channel information and the channel quality is required. During reporting, not only the channel quality but also an identifier of a frequency domain to which the measurement result belongs need to be carried. For example, the MAC CE may include an identification bit, a frequency-domain identifier, and a measurement result. The identification bit is used for identifying which type of measurement result it is. The frequency-domain identifier is used for identifying which frequency band it is. The measurement result may be a quantified value or an actual value. The MAC CE may be in a format shown in FIG. 4. If there is a need to report measurement results of a plurality of frequency domains, the MAC CE needs to carry a plurality of measurement results. The MAC CE may arrange the plurality of measurement results in an order of the frequency domains, for example, in an order from a low frequency domain to a high frequency domain. For example, if the measurement object configured by the second communication node is a frequency channel number, the measurement bandwidth is 100 MHz, and the first communication node can obtain a measurement result for each 20 MHz, the first communication node only needs to report one frequency-domain identifier and sequentially arranges the measurement results in an ascending order of frequency domains. The reported MAC CE may be in a format shown in FIG. 5.

If only the channel information is reported, the quality of a channel state may be implicitly reflected. For example, the quality of the channel state is reflected by a sequence. The channel information may be a frequency-domain identifier. Then, the MAC CE needs to carry a plurality of frequency-domain identifiers. As shown in FIG. 6, the MAC CE may sequentially arrange measurement results of a plurality of frequency domains in an ascending or descending order of the frequency-domain identifiers. For example, if the second communication node configures the measurement object as a frequency channel number, the measurement bandwidth as 100 MHz, and the second communication node can obtain a measurement result for each 20 MHz, the second communication node may sequentially arrange frequency-domain identifiers in an ascending order of the frequency-domain identifiers.

The first communication node may also report the channel quality by a PUCCH. The channel quality may be received signal quality or an interference indication. The interference indication includes, for example, interference intensity and an interference value.

The second communication node may configure a PUCCH resource for reporting the channel quality. If a time-frequency resource of a resource configuration of the PUCCH is associated with the frequency-domain identifier, that is, time-frequency resources of different PUCCHs are bound to different frequency domains, the first communication node needs to report only the channel quality at a corresponding PUCCH resource position when reporting the channel quality of a frequency domain. Conversely, if the time-frequency resource of a resource configuration of the PUCCH is not associated with the frequency-domain identifier, the first communication node needs to report the channel quality and the frequency-domain identifier at a configured PUCCH resource position.

In addition, the first communication node may also report a channel quality value when reporting the channel quality. In the case of the interference indication, the measurement result may be either a numerical value or a level of reported interference. When reporting the channel quality, the first communication node may indicate the channel quality by a measurement result such as a measured interference intensity or a measured interference frequency, and reports the channel quality to the second communication node through a PUCCH. If the measurement result has a large value range, the measurement result may be quantified. If the measurement result is within a value range, the reported measurement result is quantified as a value representing the measurement range. For example, if there is a need to carry an identifier of a frequency domain to which the measurement result belongs (e.g., an identifier of the measurement object or a frequency-domain index), bits of a PUCCH sequence include an identification bit, a frequency-domain identifier 1, a measurement result 1, a frequency-domain identifier 2, a measurement result 2, . . . . The identification bit is used for identifying a type of the measurement result. The frequency-domain identifier is used for identifying which frequency band it is. The measurement result may be a quantified value or an actual value.

If there is a need to report measurement results of a plurality of frequency domains, the PUCCH needs to carry a plurality of measurement results. If the second communication node configures the measurement object as a plurality of frequency domains, the PUCCH may sequentially arrange the measurement results of the plurality of frequency domains in an ascending order of the frequency domains. The bits of the PUCCH sequence include an identification bit, a frequency-domain identifier, a measurement result 1, a measurement result 2, a measurement result 3, . . . .

Regarding the level of the reported channel quality (e.g., interference), when the channel quality is reported to the second communication node through the PUCCH, if no frequency-domain identifier needs to be carried, when the first communication node reports interference in a frequency domain, a one-bit PUCCH (e.g., SR) needs to be sent at a corresponding PUCCH resource position. For example, an all-1 bit sequence indicates high or low interference. If a frequency-domain identifier needs to be carried, the bits of the PUCCH sequence may include an identification bit, a frequency-domain identifier, and a measurement result when the first communication node reports interference in a frequency domain.

Regarding the level of the reported channel quality (e.g., interference) of a plurality of frequency domains, when the channel quality is reported to the second communication node through the PUCCH, measurement results of the plurality of frequency domains may be sequentially arranged in an ascending order of the frequency domains and may be represented by a bitmap. Each bit is associated with a frequency domain. For example, if there are totally 4 frequency domains, 1010 is reported by the PUCCH, indicating high interference in frequency domains 0 and 2 and low interference in frequency domains 1 and 3. If a frequency-domain identifier needs to be carried, the bits of the PUCCH sequence may include a bitmap of an identification bit, a frequency-domain identifier, and a measurement result when the first communication node reports interference in a frequency domain.

When the first communication node reports the channel quality through the SRS, a time-frequency resource of a resource configuration of the SRS may be associated with a frequency-domain identifier. That is, time-frequency resources of different SRSs are bound to different frequency domains. The first communication node reports only interference at a corresponding SRS resource position when reporting the channel quality of a frequency domain. In a case where the level of the channel quality (e.g., interference) is reported through the SRS, if the first communication node reports poor channel quality or high interference in a frequency domain, the first communication node needs to send an SRS sequence at a corresponding SRS resource position.

When the first communication node reports the channel quality through the PRACH, a time-frequency resource of a resource configuration of the PRACH, and additionally or alternatively preamble configured by the second communication node may be associated with the frequency-domain identifier. That is, time-frequency resources of different PRACHs, and/or preamble are bound to different frequency domains. When the first communication node reports the channel quality of a frequency domain, the first communication node only needs to send the corresponding preamble at a corresponding PRACH resource position. Similarly, the first communication node may also report the level of interference through the PRACH. For example, when the first communication node reports high interference in a frequency domain, the first communication node needs to send a preamble sequence at a corresponding PRACH resource position.

When the second communication node schedules a Physical Uplink Shared Channel (PUSCH) of the first communication node, the first communication node may carry UCI on the PUSCH. The UCI carries channel quality (e.g., interference) and channel information. The channel information may be, for example, a frequency channel number, or a frequency channel number index. The reported channel quality may be a measurement result such as a measured interference intensity or a measured interference frequency. If the channel information and the channel quality are reported, a corresponding relationship between the channel information and the channel quality is required. That is, the UCI needs to carry not only the channel quality but also an identifier of a frequency domain to which the measurement result belongs. For example, the UCI may include an identification bit, a frequency-domain identifier 1, a measurement result 1, a frequency-domain identifier 2, a measurement result 2, . . . . The identification bit is used for identifying which type of measurement result it is. The frequency-domain identifier is used for identifying which frequency band it is. The measurement result may be a quantified value or an actual value.

If there is a need to report measurement results of a plurality of frequency domains, the UCI needs to carry a plurality of measurement results. If the measurement object configured by the second communication node are a plurality of frequency domains, the UCI may sequentially arrange the measurement results of the plurality of frequency domains in an ascending order of the frequency domains. Correspondingly, the bits of the PUCCH sequence may include an identification bit, a frequency-domain identifier, a measurement result 1, a measurement result 2, a measurement result 3, . . . .

Regarding the level of the reported channel quality (e.g., interference) of a plurality of frequency domains, when the channel quality is reported to the second communication node through the UCI, measurement results of the plurality of frequency domains may be represented by a bitmap and sequentially arranged in an ascending order of the frequency domains. Each bit is associated with a frequency domain. For example, if there are totally 4 frequency domains, 1010 is reported by the UCI, indicating high interference in frequency domains 0 and 2 and low interference in frequency domains 1 and 3. If there is a need to carry a frequency-domain identifier, bits of a UCI sequence may include an identification bit, a frequency-domain identifier, and a bitmap of the measurement results when the first communication node reports interference in a frequency domain.

FIG. 7 is a flowchart of a measurement method according to an embodiment of the present disclosure. As shown in FIG. 7, the method may include steps S701 to S702.

At S701, a first communication node acquires enabling information configured by a second communication node.

In the embodiment, the enabling information configured by the second communication node is used for indicating whether to enable the first communication node to activate a (Packet Data Convergence Protocol) PDCP duplication function, and additionally or alternatively whether to enable the first communication node to deactivate the PDCP duplication function. That is, the second communication node may jointly configure whether the first communication node has a function of autonomously activating or deactivating PDCP duplication. For example, two bits are configured in the RRC signaling. 00 represents that the first communication node or a logical channel does not have the function of autonomously activating or deactivating PDCP duplication. 01 represents that the first communication node or the logical channel has the function of autonomously activating PDCP duplication but does not have the function of deactivating PDCP Duplication. 10 represents that the first communication node or the logical channel has the function of autonomously deactivating PDCP duplication but does not have the function of activating PDCP duplication. 11 represents that the first communication node or the logical channel has the function of autonomously activating and deactivating PDCP duplication.

At S702, the first communication node operates the PDCP duplication function according to the enabling information.

For example, the operation may be performed by, in the case of the enabling information indicating enabling the first communication node to activate the PDCP duplication function, determining, by the first communication node according to a first judgment condition, whether to activate the PDCP duplication function. The first judgment condition includes at least one of a result of channel preemption, a service latency, a data transmission duration, a channel state, and a determination made by the first communication node as to whether to activate the PDCP duplication function.

For example, whether the first communication node or a logical channel activates the PDCP duplication may be judged in the following ways.

In way one, the result of channel preemption by the first communication node may be represented by a number or percentage of successful channel preemptions by the first communication node in a frequency domain (such as a carrier, channel, BWP, etc.) within a time, or an average number or percentage of successful channel preemptions in a plurality of frequency domains at a moment (such as a Transmission Time Interval (TTI), slot, symbol, time point, etc.). For example, if the number or percentage of successful channel preemptions by the first communication node is less than a threshold value and the first communication node has to-be-transmitted uplink data, or the number or percentage of successful channel preemptions by the first communication node is less than a threshold value and a latency of the to-be-transmitted uplink data of the first communication node is required to be less than a latency threshold value, or the number or percentage of successful channel preemptions by the first communication node is less than a threshold value and a latency of to-be-transmitted data of the first communication node is greater than a latency threshold value, the first communication node activates PDCP duplication and sends duplicated PDCP Service Data Units (SDUs) in other frequency domains.

The above way is also applicable to logical channels. That is, the first communication node counts the number of successful channel preemptions by a logical channel or a latency of data transmission, and then judges whether to activate PDCP duplication of the logical channel.

In way two, the result of channel preemption by the first communication node may be represented by a number of consecutive LBT failures in a frequency domain (such as a carrier, channel, BWP, etc.) within a time. For example, if the number of consecutive LBT failures is greater than a threshold value and the first communication node has to-be-transmitted uplink data, or the number of consecutive LBT failures is greater than a threshold value and a latency of the to-be-transmitted uplink data is required to be less than a latency threshold value, or the number of consecutive LBT failures is greater than a threshold and a latency of data transmission is greater than a latency threshold value, the first communication node activates PDCP duplication and sends duplicated PDCP SDUs in other frequency domains.

Similarly, way two is also applicable to a situation where the first communication node counts the number of consecutive LBT failures or a latency of data transmission in a logical channel, and then judges whether to activate PDCP duplication of the logical channel.

In way three, the first communication node may also determine that a data packet retransmission rate of a service or logical channel is greater than a threshold value, and way one or two is met.

For example, if a URLLC is mapped to a logical channel with a data packet HARQ retransmission rate greater than a corresponding threshold value and the probability of channel preemption by the first communication node is very low, the first communication node activates PDCP duplication and sends duplicated PDCP SDUs in other frequency domains; otherwise, the first communication node deactivates PDCP duplication.

The time and threshold values described above may be all configured by the second communication node.

The second communication node may also configure, in advance, candidate carriers of the first communication node for supporting PDCP duplication, such as carriers, channels or BWPs. The first communication node may select a candidate frequency domain to be activated from the candidate carriers according to a first selection condition, to transmit a PDCP duplication data packet. The first selection condition is a result of channel preemption by the first communication node or a trigger level.

For example, the first communication node selects a frequency domain to be activated (such as a carrier, channel, BWP, etc.) according to the result of channel preemption. The first communication node performs sorting according to the result of channel preemption or measurement result in each frequency domain and selects a frequency domain with a high channel preemption probability. For example, sorting is performed according to the number of successful channel preemptions by the first communication node or the percentages of successful channel preemption in a descending order, and a carrier with a large number of successful channel preemptions by the first communication node or a large percentage of successful channel preemptions may be selected. Alternatively, sorting is performed according to RSSIs or COs in an ascending order, and a carrier with a small RSSI or a low CO may be selected.

The first communication node selects and activates several frequency domains (such as carriers, channels, BWPs, etc.) according to the trigger level. If several activation conditions are set, a corresponding number of frequency domains may be selected and activated according to met conditions. For example, if the number of successful channel preemptions by the first communication node or the percentage of successful channel preemptions by the first communication node is less than a first threshold value and a latency of an uplink service of to-be-transmitted data on the first communication node is required to be less than a second threshold value, the first communication node activates PDCP duplication in one frequency domain. The frequency domain is selected in the same manner as the first communication node selects and activates a frequency domain according to the result of channel preemption. If the number of successful channel preemptions by the first communication node or the percentage of successful channel preemptions by the first communication node is less than a third threshold value and a latency of an uplink service of to-be-transmitted data on the first communication node is required to be less than a fourth threshold value, the first communication node activates PDCP duplication in two frequency domains. The frequency domains are selected in the same manner as the first communication node selects and activates frequency domains according to the result of channel preemption.

The first threshold value, the second threshold value, the third threshold value, and the fourth threshold value may be configured by the second communication node.

In the case of the enabling information indicating enabling the first communication node to deactivate a PDCP duplication function, the first communication node determines, according to a second judgment condition, whether to deactivate the PDCP duplication function. The second judgment condition includes at least one of a result of channel preemption, a service latency, a data transmission duration, a channel state, and a determination made by the first communication node as to whether to deactivate the PDCP duplication function.

For example, whether the first communication node or a logical channel deactivates PDCP duplication may be judged in the following ways.

In way one, the result of channel preemption by the first communication node may be represented by a number or percentage of successful channel preemptions by the first communication node in a frequency domain (such as a carrier, channel, BWP, etc.) within a time, or an average number or percentage of successful channel preemptions in a plurality of frequency domains at a moment (such as a TTI, slot, symbol, time point, etc.). If the number of successful channel preemptions by the first communication node is greater than a threshold value or the number of successful channel preemptions by the first communication node is greater than a threshold value and a latency of data transmission is less than a latency threshold value, the first communication node deactivates PDCP duplication.

The above way is also applicable to logical channels. That is, the first communication node counts the number of successful channel preemptions by a logical channel or a latency of data transmission, and then judges whether to deactivate PDCP duplication of the logical channel.

In way two, the channel preemption by the first communication node may be represented by the number of consecutive LBT failures in a frequency domain (such as a carrier, channel, BWP, etc.) within a time. If the number of consecutive LBT failures is less than a threshold value or the number of consecutive LBT failures is less than a threshold value and a latency of data is less than a latency threshold value, the first communication node deactivates PDCP duplication.

Similarly, the above way is also applicable to a situation where the first communication node counts the number of consecutive LBT failures or a latency of data transmission in a logical channel, and then judges whether to deactivate PDCP duplication of the logical channel.

In way three, a data packet retransmission rate of a service or logical channel is less than a threshold value, and way one or two is met.

For example, if a URLLC is mapped to a logical channel with a data packet HARQ retransmission rate less than a threshold value and the probability of channel preemption by the first communication node is very high, PDCP duplication is deactivated.

The threshold values and time in the above ways may be configured by the second communication node.

The first communication node may select, from frequency domains activated for transmitting PDCP duplication data packets that are configured by the second communication node, the frequency domains that no longer transmit PDCP duplication data packets.

For example, the first communication node performs sorting according to the channel preemption or measurement result in each frequency domain and selects a frequency domain with a low channel preemption probability for deactivation. For example, sorting is performed according to the number of successful channel preemptions by the first communication node or the percentages of successful channel preemption by the first communication node in a descending order. A frequency domain with a small number of successful channel preemptions by the first communication node or a small percentage of successful channel preemptions by the first communication node may be selected for deactivation. Alternatively, sorting is performed according to RSSIs or COs in an ascending order, and a frequency domain with a large RSSI or a high CO may be selected for deactivation.

The first communication node selects and deactivates several frequency domains (such as carriers, channels, BWPs, etc.) according to the trigger level. If several deactivation conditions are set, the first communication node selects and deactivates a corresponding number of frequency domains according to met conditions. For example, if the number of successful channel preemptions by the first communication node or the percentage of successful channel preemptions by the first communication node is greater than a first threshold value and a latency of data transmission is less than a second threshold value, the first communication node deactivates PDCP duplication in one frequency domain. The frequency domain is selected in the same manner as the first communication node selects and deactivates frequency domains. If the number of successful channel preemptions by the first communication node or the percentage of successful channel preemptions by the first communication node is greater than a third threshold value and a latency of data transmission is less than a fourth threshold value, the first communication node deactivates PDCP duplication in two frequency domains. The deactivated frequency domains are selected in the same manner as the first communication node selects and deactivates frequency domains.

In the above manner, in a case where the first communication node has a plurality of carriers, a PDCP SDU is duplicated into a plurality of SDUs by utilizing a PDCP duplication function. The SDUs are sent on the plurality of carriers respectively, to obtain a frequency gain, thereby improving the reliability of data transmission.

FIG. 8 is a flowchart of a measurement method according to an embodiment of the present disclosure. As shown in FIG. 8, the method includes steps S801 to S802.

At S801, a first communication node selects a frequency domain according to a channel state in the case of the channel state meeting a first condition.

For example, in this embodiment, the first condition may be a data packet retransmission rate being greater than a threshold value or a number of consecutive LBT failures of the first communication node on a frequency domain being greater than or equal to a preset number.

The data packet retransmission rate may be understood as a data packet retransmission rate of a service or logical channel. That is, in a case where a data packet retransmission rate of a service or logical channel is greater than the threshold value, the first communication node may select a frequency domain according to a channel state.

At S802, the first communication node sends an uplink signal in the selected frequency domain.

In some embodiments of the present disclosure, the first communication node selects a frequency domain according to a channel state in the case of the channel state meeting a first condition, and sends an uplink signal in the selected frequency domain. In this way, normal transmission of a service with a small latency can be effectively ensured.

For example, in S801, one possible implementation of the first communication node selecting a frequency domain according to a channel state is that the first communication node selects a frequency domain with low interference according to interference results of measured frequency domains (e.g., BWPs). The interference may include, for example, at least an RSSI, a CO, and the like. When a configured BWP is configured with a PRACH resource and the BWP has a minimum RSSI, and/or the lowest CO, the first communication node selects the BWP.

In addition, in order to reduce latency of the process, according to some embodiments of the present disclosure, several implementation manners are further provided.

For example, it is acknowledged that the first communication node keeps uplink synchronization in the case of a timer of the first communication node not timing out. If the first communication node still keeps uplink synchronization, the first communication node may send an SR or PUCCH signal in the selected frequency domain to inform the second communication node that the first communication node has selected the frequency domain. For example, the first communication node is subjected to consecutive LBT failures in a currently activated BWP, and a Time Advance (TA) timer is not stopped. The first communication node selects a new BWP. If the TA timer does not time out, the first communication node considers that uplink synchronization remains. Then, the first communication node may send an SR or PUCCH signal on the selected BWP to inform the second communication node that the first communication node has selected the BWP. The second communication node may configure an SR or PUCCH resource on the configured BWP for the first communication node. The resource may be used for indicating that a frequency domain selection process occurs on the first communication node.

Alternatively, the first communication node initiates a two-step Random Access Channel (RACH) connection to the selected frequency domain. For example, if the first communication node is subjected to consecutive LBT failures in a currently activated BWP, the user may initiate a two-step RACH process on the selected BWP. When consecutive uplink LBT failures of the first communication node in a frequency domain reach a certain number, the first communication node may send preamble and PUSCH data at the same time, or preamble first and PUSCH later, in the selected frequency domain.

Alternatively, the first communication node sends a PUSCH carrying UCI in the selected frequency domain. The first communication node sends a PUSCH carrying UCI in the selected frequency domain. The UCI carries an indication to indicate that a frequency domain selection process occurs on the first communication node. For example, if the first communication node is subjected to consecutive LBT failures in a currently activated BWP, the first communication node may send PUSCH data on the selected BWP according to a configured pre-configuration (e.g., an SPS or configured grant) or a resource pool (e.g., resources shared by a plurality of first communication nodes). The PUSCH may carry UCI, and the UCI may carry an indication bit. For example, an indication bit of 1 indicates that a BWP selection process occurs on the first communication node.

In addition, in some embodiments of the present disclosure, the first communication node may also acquire activation information configured by the second communication node. The activation information is used for indicating whether to enable the first communication node to activate one or more frequency-domain resource functions.

In the case of the activation information indicating enabling the first communication node to activate one or more frequency-domain resource functions, the first communication node determines activation of one or more frequency-domain resource functions according to a third judgment condition. The third judgment condition includes at least one of a result of channel preemption, a service latency, a data transmission duration, and a channel state.

For example, the third judgment condition may be at least one of the following implementation ways.

In way one, the result of channel preemption by the first communication node may be represented by a number or percentage of successful channel preemptions by the first communication node in a frequency domain (such as a BWP, carrier, etc.) within a time, or an average number or percentage of successful channel preemptions in a plurality of frequency domains at a moment (such as a TTI, slot, symbol, time point, etc.). If the number or percentage of successful channel preemptions by the first communication node is less than a threshold value and the first communication node has to-be-transmitted uplink data, or the number or percentage of successful channel preemptions by the first communication node is less than a threshold value and a latency of the to-be-transmitted uplink data on the first communication node is required to be less than a latency threshold value, the first communication node activates and selects another frequency domain.

In way two, the channel preemption by the first communication node may be represented by the number of consecutive LBT failures in a frequency domain (such as a carrier, BWP, etc.) within a time. If the number of consecutive LBT failures is greater than a threshold value and the first communication node has to-be-transmitted uplink data, or the number of consecutive LBT failures is greater than a threshold value and a latency of the to-be-transmitted uplink data on the first communication node is required to be less than a latency threshold value, the first communication node activates and selects another frequency domain.

In way three, a data packet retransmission rate of a service or logical channel is greater than a threshold value, and way one or two is met. For example, if a URLLC is mapped to a logical channel with a data packet HARQ retransmission rate greater than a threshold value and the probability of channel preemption by the first communication node is very low, the first communication node activates a plurality of frequency domains.

The time and threshold values (including latency threshold values) in the above ways may be configured by the second communication node.

In a case where the second communication node configures candidate frequency domains (such as carriers, channels, BWPs, etc.) for the first communication node, the first communication node may select a frequency domain to be activated in the following manner.

For example, the first communication node selects a frequency domain (such as a carrier, channel, BWP, etc.) to be activated according to the result of channel preemption by the first communication node. The first communication node performs sorting according to the result of channel preemption by the first communication node or the measurement result in each frequency domain, and selects a frequency domain with a high channel preemption probability. Alternatively, sorting is performed according to the number of successful channel preemptions by the first communication node or the percentage of successful channel preemptions by the first communication node in a descending order, and a frequency domain with a large number of successful channel preemptions by the first communication node or a large percentage of successful channel preemptions by the first communication node may be selected. Alternatively, sorting is performed according to RSSIs or COs in an ascending order, and a frequency domain with a small RSSI or a low CO may be selected.

In another example, the first communication node may also select and activate several frequency domains (such as carriers, channels, BWPs, etc.) according to the trigger level. If several activation/selection conditions are set, the first communication node may select and activate a corresponding number of frequency domains according to met conditions. For example, if the RSSI or CO is less than a first threshold value and a latency of an uplink service of to-be-transmitted data on the first communication node is required to be less than a second threshold value, the first communication node activates one BWP. The BWP frequency domain may be selected in the same manner as the first communication node selects and activates a frequency domain according to the result of channel preemption. If the RSSI or CO is less than a third threshold value and a latency of an uplink service of to-be-transmitted data on the first communication node is required to be less than a fourth threshold value, the first communication node activates two BWPs. The BWPs to be activated are selected in the same manner as the first communication node selects and activates a frequency domain according to the result of channel preemption.

In the above manner, when the first communication node is configured with a plurality of frequency domains (such as BWPs, carriers, etc.), the first communication node may determine whether to activate frequency-domain resources according to channel interference and occupancy. In this way, the reliability of data service transmission can be ensured.

FIG. 9 is a flowchart of a measurement method according to an embodiment of the present disclosure. As shown in FIG. 9, the method includes steps S901 to S902.

At S901, a second communication node configures measurement information.

In the embodiment, the second communication node may configure measurement information for a first communication node. The first communication node and the second communication node may be two different types of communication nodes. For example, the first communication node may be a terminal, and the second communication node may be a base station. That is, this step may be configuring, by a base station, measurement information for a terminal.

At S902, the second communication node receives a channel state indication reported by the first communication node.

In the embodiment, the channel state indication may carry a measurement result measured by the first communication node according to the measurement information. That is, the process of the scheme of the embodiment may involve configuring, by the second communication node, measurement information for the first communication node, and then receiving a measurement result measured by the first communication node according to the measurement information.

In this way, the second communication node can judge whether the first communication node is interfered according to information such as interference intensity and interference frequency after receiving the channel state indication reported by the first communication node. If it is acknowledged that the first communication node is interfered, the first communication node may be scheduled to another frequency domain, so as to ensure normal transmission of an URLLC service on the first communication node.

In embodiments of the present disclosure, the measurement information configured by the second communication node may include an indication indicating whether to enable the first communication node to perform measurement; or a measurement trigger condition configured in the case of enabling the first communication node to perform measurement; or a duration of a measurement window and an interval granularity of the measurement window; or a pre-configured resource. The duration of the measurement window is a preset duration or a plurality of measurement moments, and the interval granularity of the measurement window may also be a duration or a plurality of measurement moments. Alternatively, the second communication node may configure indication information to clearly indicate whether the first communication node needs to perform measurement.

For example, the second communication node may perform measurement configurations for some first communication nodes through an RRC message, so as to indicates whether to enable the first communication node to perform corresponding measurement.

For example, the RRC message may carry an IE. The IE indicates whether to enable the first communication node to perform measurement. The IE may be 1 bit (for example, 1 indicates Enable measurement) or an enumeration value (for example, an option of the enumeration value indicates Enable measurement).

In an example, the second communication node determines whether there are some measurement configurations to indicate whether to enable the first communication node to perform measurement. Whether to enable the first communication node to perform measurement may be indicated through a quality of service parameter of a bearer service; or through a transmission latency of the bearer service; or through whether to-be-transmitted data exists on a logical channel; or through whether an uplink SR resource corresponding to the logical channel is triggered; or through whether a type1 configured grant is configured; or through whether a type2 configured grant or SPS is activated.

In some embodiments, the second communication node may also configure a measurement trigger condition. The configured measurement trigger condition may include a measured received signal strength being greater than a signal strength threshold, a received signal strength at several consecutive measurement moments being greater than the signal strength threshold, or an LBT failure rate being greater than a first threshold within a preset time, or a measured CO being greater than a second threshold within a preset time, or a retransmission probability of a data packet being greater than a third threshold.

When the first communication node is enabled to perform measurement, if the first communication node judges that the measurement trigger condition is met, the first communication node may perform measurement according to the configured measurement information, otherwise, the first communication node does not perform measurement.

In some embodiments of the present disclosure, the second communication node may further configure a first transmission resource, and after the first communication node obtains a measurement result through measurement, a channel state indication carrying the measurement result may be reported through the first transmission resource. That is, the second communication node receives, through the first transmission resource, the channel state indication reported by the first communication node.

For example, the first transmission resource configured by the second communication node may include any one of the following transmission resources: a MAC CE, a PUCCH, an SRS, a PRACH, and UCI.

In an example, the second communication node may also configure enabling information. The enabling information is used for indicating whether to enable a PDCP duplication function of the first communication node, and/or whether to enable the first communication node to deactivate the PDCP duplication function. That is, the second communication node may jointly configure whether the first communication node has a function of autonomously activating or deactivating PDCP duplication.

For example, the second communication node configures two bits in the RRC signaling. 00 represents that the first communication node or a logical channel does not have the function of autonomously activating or deactivating PDCP duplication. 01 represents that the first communication node or the logical channel has the function of autonomously activating PDCP duplication but does not have the function of deactivating PDCP Duplication. 10 represents that the first communication node or the logical channel has the function of autonomously deactivating PDCP duplication but does not have the function of activating PDCP duplication. 11 represents that the first communication node or the logical channel has the function of autonomously activating and deactivating PDCP duplication Correspondingly, the second communication node may configure, in advance, some candidate carriers (such as carriers, channels, BWPs, etc.) for supporting PDCP duplication for the first communication node. Carrier information may be, for example, frequency channel numbers, indexes, and uplink and downlink resource configurations. These candidate carriers may be used for transmitting duplicated PDCP SDUs.

In an example, the second communication node may configure activation information. The activation information may be used for indicating whether to enable the first communication node to activate one or more frequency-domain resource functions. For example, one bit is configured in the RRC signaling. 1 represents that the first communication node is enabled to autonomously activate a plurality of frequency-domain resource functions. Otherwise, the first communication node is disabled.

Correspondingly, the second communication node may also configure some candidate frequency domains (such as carriers, channels, BWPs, etc.). Carrier information may be, for example, frequency channel numbers, indexes, uplink and downlink resource configurations, and whether the configurations supporting activation of a plurality of frequency domains.

Figure 10:
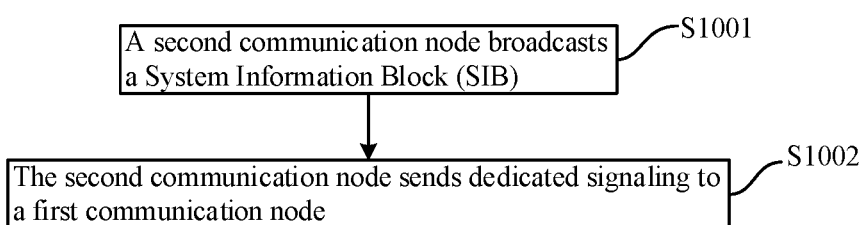
FIG. 10 is a flowchart of a measurement method according to an embodiment.

FIG. 10 is a flowchart of a measurement method according to an embodiment of the present disclosure. As shown in FIG. 10, the method includes steps S1001 to S1002.

At S1001, a second communication node broadcasts a System Information Block (SIB).

In some embodiments, the SIB in the embodiment of the present disclosure may include one or more sets of wireless parameter configurations.

For example, in a case where the SIB includes a plurality of sets of wireless parameter configurations, each set of wireless parameter configurations may include a parameter configuration index.

At S1002, the second communication node sends dedicated signaling to a first communication node.

In embodiments of the present disclosure, the second communication node and the first communication node may be two different types of communication nodes. For example, the second communication node may be understood as a base station, and the first communication node may be understood as a User Equipment (UE). Then, this step may be sending, by a base station, dedicated signaling to a UE.

For example, the dedicated signaling may include any one of the following: using an SIB configuration parameter indication, a wireless parameter configuration index, and a wireless parameter configuration.

In this way, after the first communication node receives the dedicated signaling, if the dedicated signaling includes "using an SIB configuration parameter indication", the first communication node uses wireless parameters configured in the SIB. If the dedicated signaling includes "a wireless parameter configuration index", the first communication node uses a corresponding wireless parameter configuration value in the SIB. If the dedicated signaling includes "a wireless parameter configuration", the first communication node uses wireless parameters carried in the received dedicated signaling. That is, the first communication node may determine wireless parameters that can be configured for use according to the SIB broadcast and the dedicated signaling sent by the second communication node.

Figure 11:
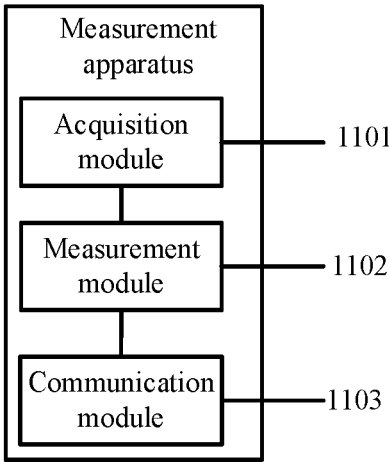
FIG. 11 is a schematic structural diagram of a measurement apparatus according to an embodiment.

FIG. 11 is a schematic structural diagram of a measurement apparatus according to an embodiment of the present disclosure. As shown in FIG. 11, the apparatus includes: an acquisition module 1101, a measurement module 1102, and a communication module 1103. The acquisition module 1101 is configured to acquire measurement information configured by a second communication node. The measurement module 1102 is configured to perform measurement according to the measurement information to obtain a measurement result. The communication module 1103 is configured to report a channel state indication that carries the measurement result in the case of the measurement result meeting a report condition.

The measurement information acquired by the acquisition module 1101 may include: an indication indicating whether to enable the measurement apparatus to perform measurement; or a measurement trigger condition configured in the case of enabling the measurement apparatus to perform measurement; or a duration of a measurement window and an interval granularity of the measurement window; or a pre-configured resource.

For example, the indicating whether to enable the measurement apparatus to perform measurement may include: indicating, through a quality of service parameter of a bearer service, whether to enable the measurement apparatus to perform measurement; or indicating, through a transmission latency of the bearer service, whether to enable the measurement apparatus to perform measurement; or indicating, through whether to-be-transmitted data exists on a logical channel, whether to enable the measurement apparatus to perform measurement; or indicating, through whether an uplink SR resource corresponding to a logical channel is triggered, whether to enable the measurement apparatus to perform measurement; or indicating, through whether a type1 configured grant is configured, whether to enable the measurement apparatus to perform measurement; or indicating, through whether a type2 configured grant or SPS is activated, whether to enable the measurement apparatus to perform measurement.

The acquisition module 1101 is further configured to acquire a measurement trigger condition configured by the second communication node. The configured measurement trigger condition includes: a measured received signal strength being greater than a signal strength threshold; or a received signal strength at several consecutive measurement moments being greater than the signal strength threshold; or an LBT failure rate being greater than a first threshold within a preset time; or a measured CO being greater than a second threshold within a preset time; or a retransmission probability of a data packet being greater than a third threshold.

In an example, the measurement module 1102 may be configured to measure one or more frequency domains according to the measurement information at a measurement moment.

In the case of the measurement information being a measurement window, the measurement module 1102 may be configured to measure all measurement moments in the measurement window to obtain measurement values of all the measurement moments, and calculate a measurement result from the measurement values of all the measurement moments. The duration of the measurement window is a preset duration or a plurality of measurement moments. Alternatively, in the case of the measurement information being a pre-configured resource, the measurement module 1102 may be configured to measure one or more frequency domains at a transmission moment of the pre-configured resource.

In some embodiments, the communication module 1103 may be configured to report, through a first transmission resource, a channel state indication that carries the measurement result. The first transmission resource includes any one of the following transmission resources: an MAC CE, a PUCCH, an SRS, a PRACH, and UCI.

Figure 12:
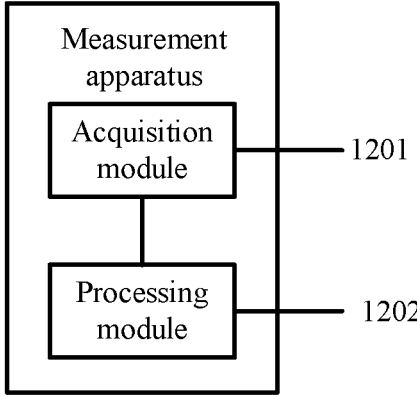
FIG. 12 is a schematic structural diagram of a measurement apparatus according to an embodiment.

FIG. 12 is a schematic structural diagram of a measurement apparatus according to an embodiment of the present disclosure. As shown in FIG. 12, the apparatus includes: an acquisition module 1201, and a processing module 1202. The acquisition module 1201 is configured to acquire enabling information configured by a second communication node, the enabling information being used for indicating whether to enable the measurement apparatus to activate the PDCP duplication function, and/or whether to enable the measurement apparatus to deactivate the PDCP duplication function. The processing module 1202 is configured to operate the PDCP duplication function according to the enabling information.

For example, in the case of the enabling information indicating enabling the measurement apparatus to activate the PDCP duplication function, the processing module 1202 may be configured to determine, according to a first judgment condition, whether to activate the PDCP duplication function. The first judgment condition includes at least one of the following: a result of channel preemption, a service latency, a data transmission duration, a channel state, and a determination made by the measurement apparatus as to whether to activate the PDCP duplication function.

Alternatively, in the case of the enabling information indicating enabling the measurement apparatus to deactivate the PDCP duplication function, the processing module 1202 may be configured to determine, according to a second judgment condition, whether to deactivate the PDCP duplication function. The second judgment condition includes at least one of the following: a result of channel preemption, a service latency, a data transmission duration, a channel state, and a determination made by the measurement apparatus as to whether to deactivate the PDCP duplication function.

In an example, the measurement apparatus may further include a selection module configured to select a frequency domain to be activated according to a first selection condition; and a communication module configured to transmit a PDCP duplication data packet in the activated frequency domain. The first selection condition is a result of channel preemption by the measurement apparatus or a trigger level.

Figure 13:
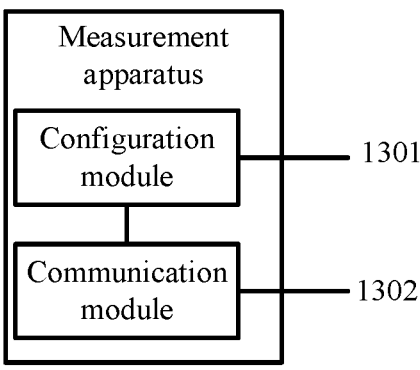
FIG. 13 is a schematic structural diagram of a measurement apparatus according to an embodiment.

FIG. 13 is a schematic structural diagram of a measurement apparatus according to an embodiment of the present disclosure. As shown in FIG. 13, the apparatus includes: a configuration module 1301 and a communication module 1302. The configuration module 1301 is configured to configure measurement information. The communication module 1302 is configured to receive a channel state indication reported by a first communication node. The channel state indication carries a measurement result measured by the first communication node according to the measurement information.

For example, the measurement information includes: an indication indicating whether to enable the first communication node to perform measurement; or a measurement trigger condition configured in the case of enabling the first communication node to perform measurement; or a duration of a measurement window and an interval granularity of the measurement window; or a pre-configured resource.

The indicating whether to enable the first communication node to perform measurement may include: indicating, through a quality of service parameter of a bearer service, whether to enable the first communication node to perform measurement; or indicating, through a transmission latency of the bearer service, whether to enable the first communication node to perform measurement; or indicating, through whether to-be-transmitted data exists on a logical channel, whether to enable the first communication node to perform measurement; or indicating, through whether an uplink SR resource corresponding to the logical channel is triggered, whether to enable the first communication node to perform measurement; or indicating, through whether a type1 configured grant is configured, whether to enable the first communication node to perform measurement; or indicating, through whether a type2 configured grant or SPS is activated, whether to enable the first communication node to perform measurement.

In an example, the configuration module 1301 is further configured to configure a measurement trigger condition. The configured measurement trigger condition includes: a measured received signal strength being greater than a signal strength threshold; or a received signal strength at several consecutive measurement moments being greater than the signal strength threshold; or an LBT failure rate being greater than a first threshold within a preset time; or a measured CO being greater than a second threshold within a preset time; or a retransmission probability of a data packet being greater than a third threshold.

In some embodiments, the configuration module 1301 is further configured to configure a first transmission resource. The communication module is configured to receive, through the first transmission resource, a channel state indication reported by the first communication node. The first transmission resource includes any one of the following transmission resources: an MAC CE, a PUCCH, an SRS, a PRACH, and UCI.

In an example, the configuration module 1301 may be configured to configure enabling information. The enabling information is used for indicating whether to enable the first communication node to activate a PDCP duplication function, and additionally or alternatively whether to enable the first communication node to deactivate the PDCP duplication function.

Figure 14:
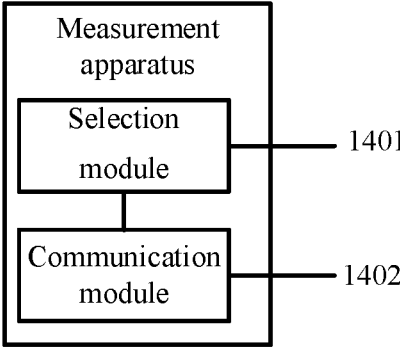
FIG. 14 is a schematic structural diagram of a measurement apparatus according to an embodiment.

FIG. 14 is a schematic structural diagram of a measurement apparatus according to an embodiment of the present disclosure. As shown in FIG. 14, the apparatus includes: a selection module 1401, and a communication module 1402. The selection module 1401 is configured to select a frequency domain according to a channel state in the case of the channel state meeting a first condition. The communication module 1402 is configured to send an uplink signal in the selected frequency domain.

In an example, the selection module 1401 is configured to select a frequency domain with low interference according to interference results of measured frequency domains.

The measurement apparatus may further include a determination module configured to determine that the measurement apparatus keeps uplink synchronization in the case of a timer of the measurement apparatus not timing out. The communication module 1402 is configured to initiate a two-step RACH connection when the number of consecutive LBT failures of the measurement apparatus in the selected frequency domain is greater than or equal to a preset number; or send a PUSCH carrying UCI in the selected frequency domain.

The measurement apparatus may further include an acquisition module configured to acquire activation information configured by the second communication node, the activation information being used for indicating whether to enable the measurement apparatus to activate one or more frequency-domain resource functions. In the case of the activation information indicating enabling the measurement apparatus to activate the one or more frequency-domain resource functions, the determination module is configured to determine activation of the one or more frequency-domain resource functions according to a third judgment condition.

The third judgment condition includes at least one of the following: a result of channel preemption, a service latency, a data transmission duration, and a channel state.

Figure 15:
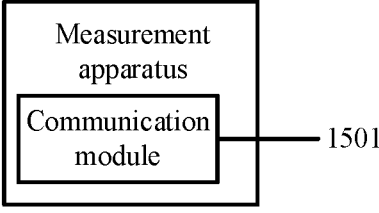
FIG. 15 is a schematic structural diagram of a measurement apparatus according to an embodiment.

FIG. 15 is a schematic structural diagram of a measurement apparatus according to an embodiment of the present disclosure. As shown in FIG. 15, the apparatus includes: a communication module 1501. The communication module 1501 is configured to broadcast an SIB, and send dedicated signaling to a first communication node.

In an example, the SIB includes at least one set of wireless parameter configurations. In the case of a plurality of sets of wireless parameter configurations being provided, each set of wireless parameter configurations may include a parameter configuration index.

The dedicated signaling may include any one of the following: using an SIB configuration parameter indication, a wireless parameter configuration index, and a wireless parameter configuration.

Figure 16:
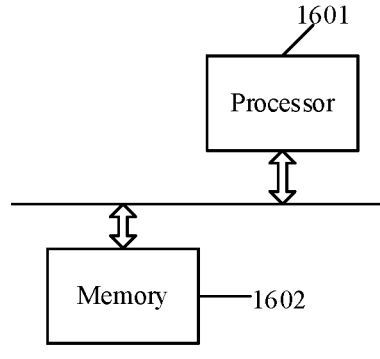
FIG. 16 is a schematic structural diagram of a node according to an embodiment.

FIG. 16 is a schematic structural diagram of a node according to an embodiment. As shown in FIG. 16, the node includes a processor 1601 and a memory 1602. One or more processors 1601 may be provided in the node. One processor 1601 is taken as an example in FIG. 16. The processor 1601 and the memory 1602 in the node may be connected by a bus or in other manners. The connection by a bus is taken as an example in FIG. 16.

As a computer-readable storage medium, the memory 1602 may be configured to store software programs, computer-executable programs and modules, such as the program instructions/modules (e.g., the selection module 1401 and the communication module 1402 in the measurement apparatus, and other modules in other embodiments) corresponding to the measurement methods in the embodiments of FIG. 3, FIG. 7, and FIG. 8 of the present disclosure. The software programs, instructions, and modules stored in the memory 1602, when executed by the processor 1601, cause the processor 1601 to implement the measurement methods above.

The memory 1602 mainly includes a program storage area and a data storage area. The program storage area may store an operating system and an application required by at least one function. The data storage area may store data created according to the use of the node, and the like. In addition, the memory 1602 may include a high-speed Random Access Memory (RAM), and may also include a non-volatile memory such as at least one disk storage device, a flash memory, or another volatile solid-state storage device.

Figure 17:
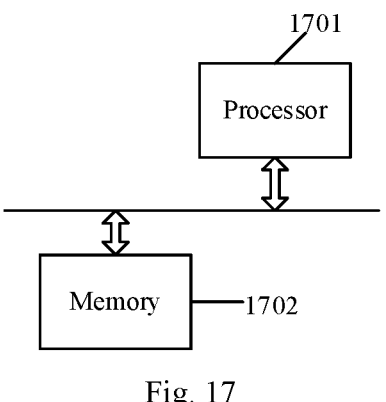
FIG. 17 is a schematic structural diagram of a node according to an embodiment.

FIG. 17 is a schematic structural diagram of a node according to an embodiment. As shown in FIG. 17, the node includes a processor 1701 and a memory 1702. One or more processors 1701 may be provided in the node. One processor 1701 is taken as an example in FIG. 17. The processor 1701 and the memory 1702 in the node may be connected by a bus or in other manners. The connection by a bus is taken as an example in FIG. 17.

As a computer-readable storage medium, the memory 1702 may be configured to store software programs, computer-executable programs and modules, such as the program instructions/modules (e.g., the configuration module 1301 and the communication module 1302 in the measurement apparatus) corresponding to the measurement methods in the embodiments of FIG. 9 and FIG. 10 of the present disclosure. The software programs, instructions, and modules stored in the memory 1702, when executed by the processor 1701, cause the processor 1701 to implement the measurement methods above.

The memory 1702 mainly includes a program storage area and a data storage area. The program storage area may store an operating system and an application required by at least one function. The data storage area may store data created according to the use of the node, and the like. In addition, the memory 1702 may include a high-speed Random Access Memory (RAM), and may also include a non-volatile memory such as at least one disk storage device, a flash memory, or another volatile solid-state storage device.

According to some embodiments of the present disclosure, further provided is a storage medium including computer-executable instructions which, when executed by a computer processor, cause the processor to perform a measurement method. The method includes: acquiring, by a first communication node, measurement information configured by a second communication node; performing, by the first communication node, measurement according to the measurement information to obtain a measurement result; and reporting, by the first communication node, a channel state indication that carries the measurement result in the case of the measurement result meeting a report condition.

According to some embodiments of the present disclosure, further provided is a storage medium including computer-executable instructions which, when executed by a computer processor, cause the processor to perform a measurement method. The method includes: acquiring, by a first communication node, enabling information configured by a second communication node, the enabling information being used for indicating whether to enable the first communication node to activate a PDCP duplication function, and additionally or alternatively whether to enable the first communication node to deactivate the PDCP duplication function; and operating, by the first communication node, the PDCP duplication function according to the enabling information.

According to some embodiments of the present disclosure, further provided is a storage medium including computer-executable instructions which, when executed by a computer processor, cause the processor to perform a measurement method. The method includes: selecting, by a first communication node, a frequency domain according to a channel state in the case of the channel state meeting a first condition; and sending, by the first communication node, uplink data in the selected frequency domain.

According to some embodiments of the present disclosure, further provided is a storage medium including computer-executable instructions which, when executed by a computer processor, cause the processor to perform a measurement method. The method includes: configuring, by a second communication node, measurement information; and receiving, by the second communication node, a channel state indication reported by a first communication node, the channel state indication carrying a measurement result measured by the first communication node according to the measurement information.

According to some embodiments of the present disclosure, further provided is a storage medium including computer-executable instructions which, when executed by a computer processor, cause the processor to perform a measurement method. The method includes: broadcasting, by a second communication node, an SIB; and sending, by the second communication node, dedicated signaling to a first communication node.

In general, embodiments of the present disclosure may be implemented in hardware or dedicated circuits, software, logic, or any combination thereof. For example, some aspects may be implemented in hardware while other aspects may be implemented in firmware or software that may be executed by a controller, a microprocessor, or other computing apparatuses, although the present disclosure is not limited thereto.

Embodiments of the present disclosure may be implemented by computer program instructions executed by a data processor of a measurement apparatus, for example, in a processor entity, may be implemented by hardware, or may be implemented by a combination of software and hardware. The computer program instructions may be assembly instructions, Instruction Set Architecture (ISA) instructions, machine instructions, machine-related instructions, microcodes, firmware instructions, state setting data, or source or object codes written in any combination of one or more programming languages.

A block diagram of any logic flow in drawings of the present disclosure may represent program steps, may represent interconnected logic circuits, modules, and functions, or may represent a combination of program steps, logic circuits, modules, and functions. Computer programs may be stored in a memory. The memory may be of any type suitable for a local technical environment and may be implemented using any suitable data storage technology, such as, but not limited to, a Read-Only Memory (ROM), an RAM, an optical memory apparatus and system (Digital Versatile Disc (DVD) or Compact Disk (CD)), etc. A computer-readable medium may include a non-instantaneous storage medium. The data processor may be of any type suitable for the local technical environment, such as, but not limited to, a general-purpose computer, a specialized computer, a microprocessor, a Digital Signal Processor (DSP), an Application Specific Integrated Circuit (ASIC), a Field-Programmable Gate Array (FPGA)), and a processor based on a core processor architecture.

The invention claimed is:

1. A measurement method, comprising:
acquiring, by a first communication node, measurement information configured by a second communication node;
performing, by the first communication node, measurement according to the measurement information to obtain a measurement result; and reporting, by the first communication node, a channel state indication which carries the measurement result in response to the measurement result meeting a reporting condition;
wherein the measurement information configured by the second communication node comprises:
a duration of a measurement window and an interval granularity according to which the measurement window slides, the measurement window comprising a plurality of measurement moments, and the interval granularity of the measurement window being a preset duration or a plurality of measurement moments;
wherein the performing, by the first communication node, measurement according to the measurement information comprises:
performing, by the first communication node, measurement at all measurement moments in the measurement window to obtain measurement values of all the measurement moments,
calculating the measurement result from the measurement values of all the measurement moments; and
sliding, by the first communication node, the measurement window according to the interval granularity to be able to perform a next measurement.

2. The method of claim 1, wherein the measurement information configured by the second communication node comprises:
an indication indicating whether to enable the first communication node to perform measurement; or
a configured measurement triggering condition in response to enabling the first communication node to perform measurement.

3. The method of claim 2, wherein the indicating whether to enable the first communication node to perform measurement comprises at least one of:
indicating, through a quality of service parameter of a bearer service, whether to enable the first communication node to perform measurement;
indicating, through a transmission latency of the bearer service, whether to enable the first communication node to perform measurement; and
indicating, through whether to-be-transmitted data exists on a logical channel, whether to enable the first communication node to perform measurement.

4. The method of claim 1, further comprising:
acquiring, by the first communication node, a measurement triggering condition configured by the second communication node, wherein the measurement triggering condition configured by the second communication node comprising at least one of:
a measured received signal strength being greater than a signal strength threshold;
a Listen Before Talk (LBT) failure rate within a preset time being greater than a first threshold; and
a retransmission probability of a data packet being greater than a third threshold.

5. The method of claim 1, wherein the reporting, by the first communication node, a channel state indication which carries the measurement result comprises:
reporting, by the first communication node through a first transmission resource, a channel state indication which carries the measurement result;
wherein the first transmission resource comprises one of the following transmission resources: a Media Access Control Control Element (MAC CE), a Physical Uplink Control Channel (PUCCH), a Sounding Reference Signal (SRS), a Physical Random Access Channel (PRACH), and Uplink Control Information (UCI).

6. A node, comprising:

a memory, a processor, and a computer program stored in the memory and executable by the processor, wherein computer program, when executed by the processor, causes the processor to perform the measurement method of claim 1.

7. A non-transitory computer-readable storage medium storing a computer program which, when executed by a processor, causes the processor to perform the measurement method of claim 1.

\* \* \* \* \*